US008453385B2

(12) United States Patent
Schmitt

(10) Patent No.: US 8,453,385 B2
(45) Date of Patent: Jun. 4, 2013

(54) SAFETY EDGE DOOR APPARATUS

(76) Inventor: Andrew J. Schmitt, Massaqequa, NY (US)

( * ) Notice: Subject to any disclaimer, the term of this patent is extended or adjusted under 35 U.S.C. 154(b) by 243 days.

(21) Appl. No.: 12/855,101

(22) Filed: Aug. 12, 2010

(65) Prior Publication Data

US 2012/0036784 A1 Feb. 16, 2012

(51) Int. Cl.
*B60R 27/00* (2006.01)

(52) U.S. Cl.
USPC .................................. 49/462; 49/383; 16/389

(58) Field of Classification Search
USPC ................ 49/70, 383, 460, 462; 16/249, 382, 16/389
See application file for complete search history.

(56) References Cited

U.S. PATENT DOCUMENTS

| | | | | | |
|---|---|---|---|---|---|
| 2,133,199 | A | * | 10/1938 | Kammerer | 49/493.1 |
| 2,331,340 | A | * | 10/1943 | Mosher | 49/383 |
| 3,827,183 | A | | 8/1974 | Zimmerman et al. | |
| 5,076,017 | A | | 12/1991 | Jacobs | |
| 5,509,235 | A | * | 4/1996 | Chander | 49/383 |
| 5,983,570 | A | * | 11/1999 | Brown | 49/475.1 |
| 6,550,217 | B2 | | 4/2003 | Heung-Bin | |
| 6,643,980 | B1 | | 11/2003 | Dorder et al. | |
| 7,086,200 | B2 | * | 8/2006 | Rathgeb | 49/462 |
| D655,151 | S | * | 3/2012 | O'Doan | D8/402 |
| 2004/0034969 | A1 | * | 2/2004 | Wegman | 16/389 |
| 2007/0017158 | A1 | * | 1/2007 | Larkin et al. | 49/460 |
| 2009/0151264 | A1 | * | 6/2009 | Boens | 49/383 |
| 2011/0094057 | A1 | * | 4/2011 | Duffy | 16/249 |

FOREIGN PATENT DOCUMENTS

| | | | | |
|---|---|---|---|---|
| DE | 3435615 A1 | * | 4/1985 |
| DE | 3725360 A | * | 2/1989 |
| FR | 2620484 | * | 3/1989 |
| JP | 2007063776 A | | 3/2007 |
| JP | 2007-138587 | * | 6/2007 |
| WO | WO 94/06993 | * | 3/1994 |

* cited by examiner

*Primary Examiner* — Jerry Redman
(74) *Attorney, Agent, or Firm* — Harold G. Furlow, Esq

(57) ABSTRACT

A safety door apparatus is described that includes a door with a removable and replaceable safety edge. The door defines a notch in at least one of the elongate edges of the door. The notch defines a recessed surface that conformingly mates with the resilient safety edge. A safety hinge assembly connects to the door and receives the safety edge. The recessed surface of the notch can extend partially or the full length of the elongate edge of the door. The safety edge can similarly extend partially or the full length of the elongate edge of the door. The safety door can include multiple configurations of removable and replaceable edge portions that can include a non-safety edge. A decorative molding is positionable over the connection between the safety edge and notch.

19 Claims, 4 Drawing Sheets

FIG. 5
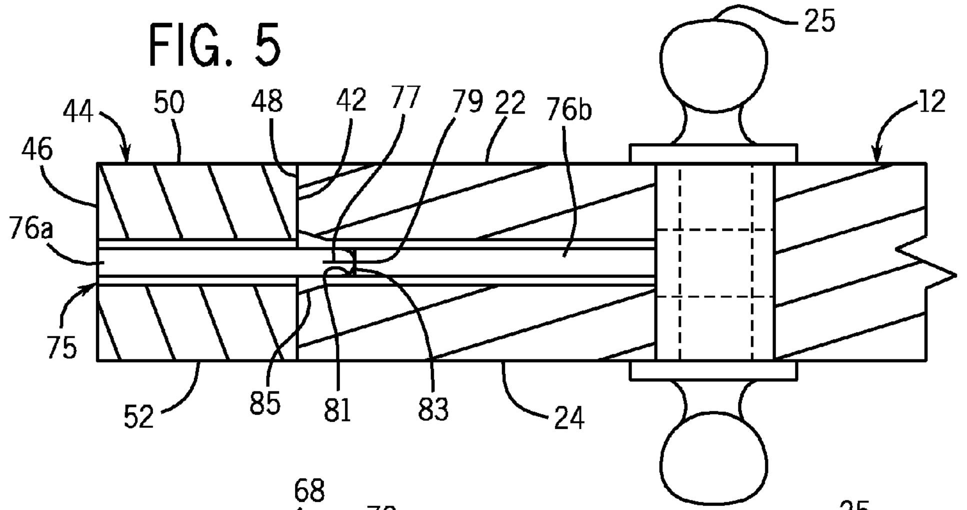
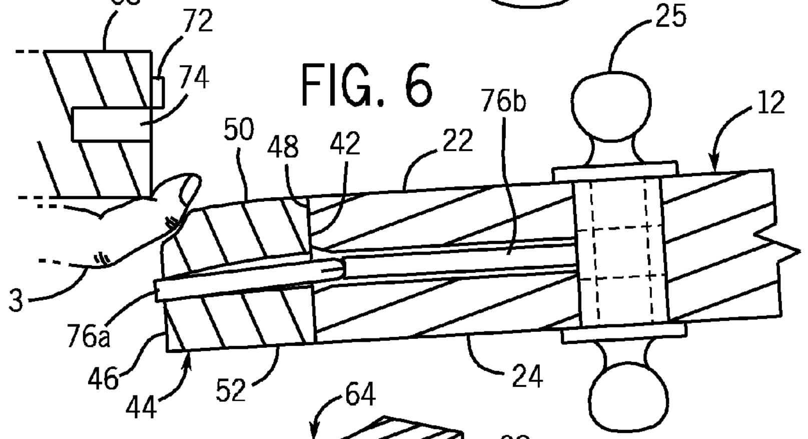
FIG. 6
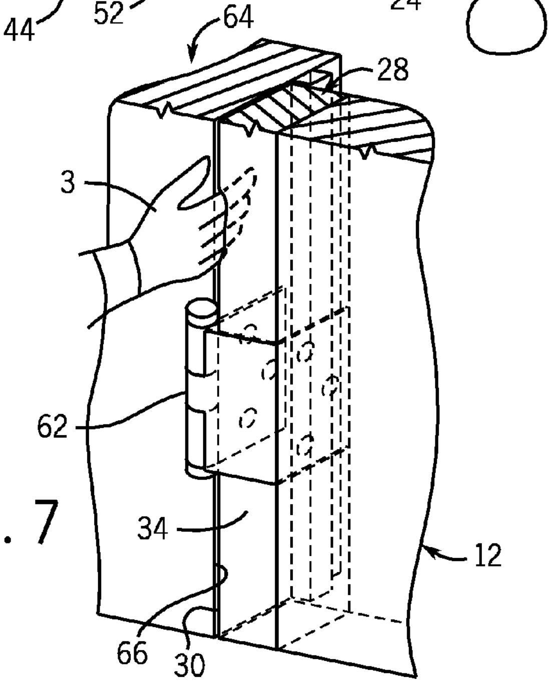
FIG. 7

SAFETY EDGE DOOR APPARATUS

BACKGROUND OF THE INVENTION

1. Field of the Invention

This disclosure relates to a safety apparatus for doors and in particular to a safety apparatus for the edges of doors.

2. Description of the Related Art

The door to door frame interface is widely known to be a source of injury in the residential, commercial and industrial environment. Devices that reduce the chances of damaging property or injuring body parts such as fingers caught between door frames and doors include the use of rubber or polymer strips that fill an extended gap between the doors and frame to preclude or minimize the injuring of fingers and/or hands. Other devices use coverings that block access to the hinged edge of the door, doors that rotate on a spindle as well as flexible members on the opposing leading edge that latches with the doors frame.

These devices often cannot be readily integrated into traditional door frames, cannot convert between a traditional door and safety door, lack an aesthetic element or do not readily address the risks associated with the hinged edge of the door. A safety edge door apparatus is needed that readily addresses both edges of the door, has the ability to provide a traditional door appearance and can be converted between a safety door and traditional door.

SUMMARY OF THE INVENTION

A safety door apparatus is described that comprises a door that includes one or more safety edges and safety hinges. The door includes a first elongate edge, a second elongate edge, a bottom edge and a top edge. The side edges are connected to the bottom edge and top edge. A first side and an opposed second side connect to the edges. The length along the top and bottom edges between the elongate edges defines a lateral width of the door. Similarly, the thickness of the door is defined between the first and second sides. The direction upward is understood to be towards the top edge of the door.

A notch extends inward from the elongate edge of the door to define one or more recessed surfaces. In one preferred embodiment the notch is an approximately right angle cut that extends from the elongate edge of door and approximately aligned with the bottom edge for a predetermined distance in the inward or in a lateral direction towards a centerline of the door. In one preferred embodiment, the notch extends inward from the elongate edge of the door for a predetermined distance that can vary between approximately one inch and approximately two inches, but can also be between approximately one and a half inch to approximately two inches in lateral distance. This defines the approximately lateral length of a first recessed surface and the approximate position of a second recessed surface that is preferably approximately aligned with the elongate edges. This lateral distance is intended to provide sufficient distance for at least a portion of one or more fingers of an average hand. The second recessed surface preferably extends between the bottom edge and a position at least in proximity to and below a door handle assembly of the door. In another preferred embodiment the notch extends from the bottom edge to at least a position in proximity to and below the handle assembly of the door. In proximity as defined herein means on or about a given position. It is understood, however, that the notch as defined herein can take a variety of shapes and that the notch can also vary in its position along one or more portions or segments of the elongate edge. The notch can further extend from in proximity to and below the handle assembly upwards along the longitudinal edge for one or more additional segments. For example, the notch can continue to extend upward from the previously described position in proximity to and below the door handle assembly to any position up to the top edge of the door. Similarly, there can be multiple notches and/or safety edges on each longitudinal edge of the door.

The safety edge conformingly mates with the notch and removably connects to the door. The safety edge is constructed or fabricated of a resilient material that provides a flexible edged portion of the door. The safety edge includes a first wall, a second wall opposed to the first wall, a third wall and a fourth wall opposed to the third wall, a fifth wall and a sixth wall opposed to the fifth wall. The safety edge approximately aligns with the elongate edge that defines the notch, the bottom edge and the sides of the door. When the safety edge is connected to the door, the fifth wall aligns with the bottom edge of the door and the third wall and the fourth wall align with the first side and second side of the door, respectively. The notch can receive an edge that is a non safety edge.

A safety hinge assembly connects the safety door apparatus to a door frame. The safety hinge assembly includes a first portion and a second portion that are connected by a hinge. The first portion includes a first plate and the second portion includes a second plate and a third plate. The first plate connects to the door frame. The second plate is approximately aligned with the first side of the door and connects at an approximately perpendicular angle to the third plate. The third plate connects to the recessed edge of the door. The first portion is rotatable relative to the second portion of the hinge assembly. The perpendicular angle of the safety hinge assembly receives the safety edge that is connected to the hinged elongate edge of the door.

The recessed surface of the notch and the safety edge of the safety door assembly can also extend from the bottom edge to the top edge of the door. When the safety edge extends between the bottom and top edges of the door, the safety edge defines an aperture for a door handle assembly to extend through the safety edge to engage with the door frame. The safety door assembly can also include a safety stop in proximity to the door bottom edge that engages the door frame. The safety edge door assembly can also include a non-safety edge that can be removed and replaced as well as the safety edge. The appearance of the safety door assembly is selectively enhanced by the use of decorative molding that creates the appearance of a standard non-safety door by concealing the connection between the safety edge and the notch.

BRIEF DESCRIPTION OF THE DRAWINGS

FIG. 5 is the cross-sectional view of FIG. 4 with the bolt of the latching mechanism of the door withdrawn into the safety edge;

FIG. 6 is the cross-sectional view of FIG. 4 that further showing the second safety edge in operation, the second safety edge and door frame interfacing with the second safety edge and latch mechanism flexing in response to a displacement by a hand portion; and FIG. 7 is a close up perspective view of the first safety edge, door frame and safety edge in operation, the first safety edge flexing in proximity to the safety hinge in response to a displacement by a portion of a second hand portion.

DETAILED DESCRIPTION OF THE INVENTION

Figure 1:
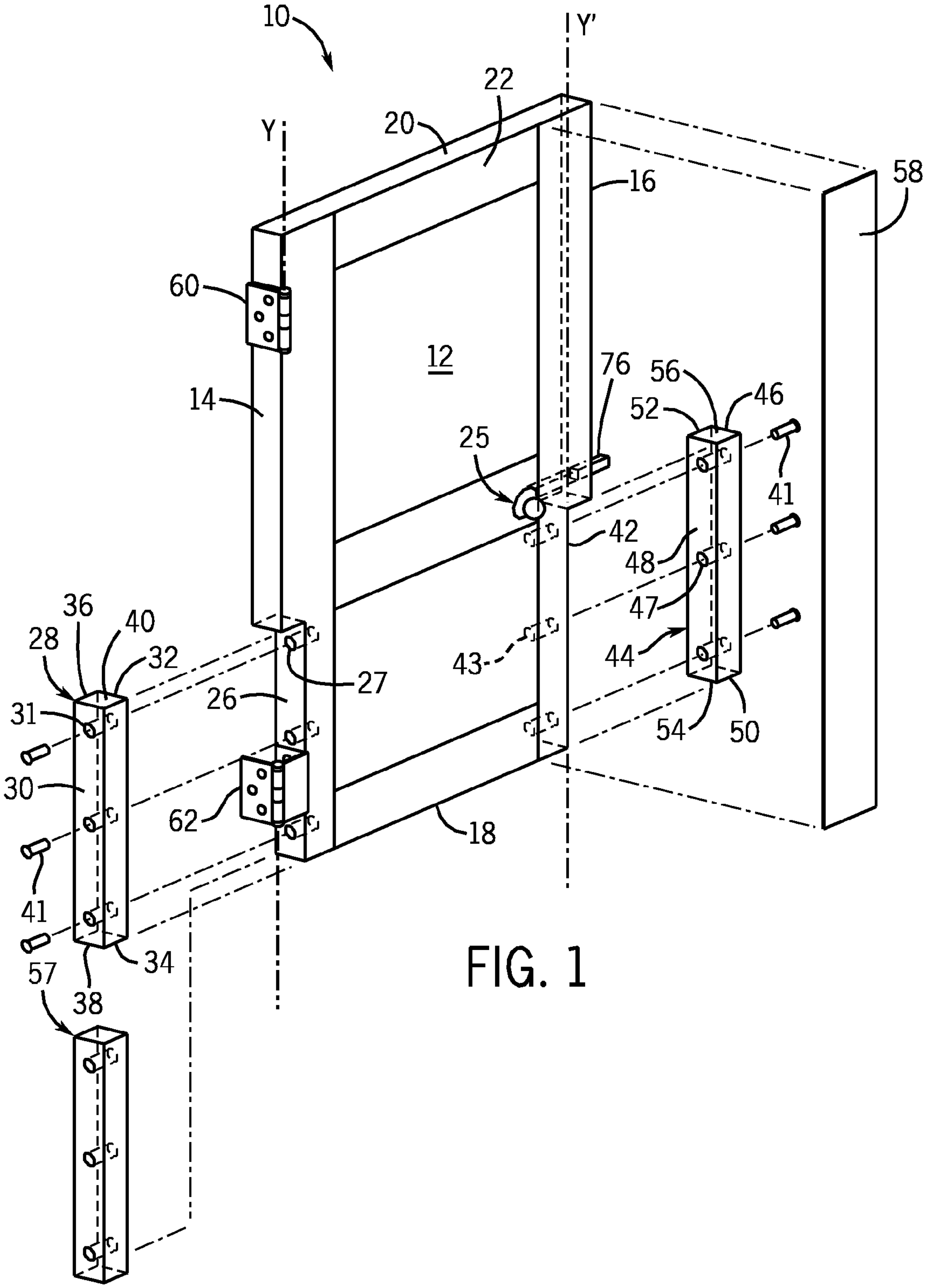
FIG. 1 is a first longitudinal edge, first side and top edge perspective view of the safety edge door apparatus constructed in accordance with the present disclosure showing a first safety edge, a second safety edge and a safety hinge of the apparatus.

Referring initially to FIG. 1, safety edge door apparatus 10 includes a door 12 with a first edge 14, a second edge 16 opposed to first edge 14, a third edge 18 and a fourth edge 20 opposed to third edge 18. First edge 14 and second edge 16 are elongate edges connected by third or bottom edge 18 and fourth or top edge 20 to define the outer edge perimeter and width of door 12. Door 12 has a first approximately planar side 22 and a second approximately planar side 24 (See FIG. 2) that connect to opposing sides of edges 14, 16, 18 and 20. Door 12 also includes a handle assembly 25.

A notch 26 is defined in first edge 14 of door 12 that includes one or more recessed surfaces. In this preferred embodiment, notch 26 includes a first recessed surface and a second recessed surface. The first recessed surface of notch 26 extends inwardly from first edge 14, is approximately aligned with third edge 18 and is preferably between approximately one and approximately two inches, but can also extend as far as between approximately one and a half (1½) and approximately two (2) inches. The first recessed surface is preferably below and in proximity to handle assembly 25. The second recessed surface extends from third edge 18 to the first recessed surface. The second recessed surface is preferably approximately aligned with first edge 14. The second recessed surface defines a first longitudinal axis Y. Door 12 includes one or more fasteners 27 in or in proximity to the recessed surface of notch 26 that connect with a first safety edge 28.

First safety edge 28 is constructed to be positioned in notch 26 and conformingly mate with door 12. First safety edge 28 is received by notch 26 and provides a resilient edge for a portion of door 12 that is approximately aligned with first edge 14, third edge 18, first side 22 and second side 24. First safety edge or flexible edge 28 has a first wall 30, a second wall 32 opposed to first wall 30, a third wall 34, a fourth wall 36 opposed to third wall 34, a fifth wall 38 and a sixth wall 40 that opposes wall 38. First wall 30 and second wall 32 are elongate longitudinal walls connected by fifth wall 38 and sixth wall 40 to define the outer edge perimeter or width of safety edge 28 that approximates the width of door 12.

When first safety edge 28 is installed in door 12, first wall 30 is approximately aligned with first edge 14 of door, second wall 32 interfaces with the second recessed surface of notch 26, third wall 34 is approximately aligned with first side 22 of door 12, fourth wall 36 is approximately aligned with second side 24, fifth wall 38 is approximately aligned with lower edge 18 and sixth wall 40 interfaces with the first recessed surface of notch 26.

First safety edge 28 can be permanently connected to door 12, but is preferably removably attached. Safety edge 28 is configured to be received by notch 26 and retained in position by fasteners 27. Fasteners 27 can be an adhesive, for example, or alternatively second wall 32 and/or sixth wall 40 can include connectors that mate with fasteners 27 in any standard type connection to include sliding, snap fit, threaded or friction.

Door 12 also defines a notch 42 in second edge 16 that is opposed to and preferably configured identical to notch 26. The first recessed surface of notch 42 extends inwardly from second edge 16 between approximately one and approximately two inches, but can extend between approximately one and a half (1½) and approximately two (2) inches and is approximately aligned with third edge 18. The first recessed surface is preferably below and in proximity to handle assembly 25. The second recessed surface of notch 42 extends approximately vertically from third side 18 to the first surface of notch 42 and defines a second longitudinal axis Y'. Door 12 includes one or more fasteners 43 that connect a second safety edge 44 to door 12.

Second safety edge 44 is constructed to be positioned in notch 26 and conformingly mate with notch 42. Second safety edge 44 is received by notch 42 and provides a resilient edge for a portion of door 12 that is approximately aligned with second edge 16, third edge 18, first side 22 and second side 24. Second safety edge 44 has a first wall 46, a second wall 48 opposed to first wall 46, a third wall 50, a fourth wall 52 opposed to third wall 50, a fifth wall 54 and a sixth wall 56 that opposes wall 54. First wall 46 and second wall 48 are elongate longitudinal walls connected by fifth wall 54 and sixth wall 56 to define the outer edge perimeter or width of safety edge 44 that approximates the width of door 12.

When safety edge 44 is installed in door 12, first wall 46 is aligned with edge 16, second wall 48 interfaces with the approximately vertical second surface of notch 42, third wall 50 is approximately aligned with first side 22, fourth wall 52 is approximately aligned with second side 24, fifth wall 54 is approximately aligned with lower edge 18 and sixth wall 56 interfaces with the first surface of notch 42.

Second safety edge 44 can be permanently connected to door 12, but is preferably removably attached to notch 42. As described previously for fasteners 27, fasteners 43 can be an adhesive, for example, or alternatively second wall 50 and/or sixth wall 56 can include different kinds of connectors that mate with fasteners 43 in a snap fit or friction type connection. In one preferred embodiment, safety edges 28, 44 define one or more apertures 31, 47 that extend laterally through safety edges 28, 44 to align with fasteners 27, 43 that are apertures in door 12. A threaded connector 41 is positioned through apertures 31, 47 and engages with fasteners 27, 43 as threaded receptacles to securely fasten safety edges 28, 44 to door 12. Second walls 32, 48 include a backing and/or are sufficiently stiff to retain safety edges 28, 44 in position in their respective notches 26, 42.

Safety edges 28 and 44 are constructed to conformingly mate with their respective notches 26 and 42. This mating interface includes the respective walls of safety edges 28 and 44 aligning approximately flush with edges 14, 16 and 18 as well as sides 22 and 24 (See FIG. 2) of door 12. Safety edges 28 and 44 preferably include ornamental designs to emulate and/or accent the façade of door 12 and can be interchangeable between notches 26 and 42. Safety edges 28 and 44 are flexible members that are constructed of one or more resilient materials such as for example a rubber or a polymer. The materials of construction and the desired degree of flexibility and resilience of safety edges 28 and 44 can be varied for a specific application. For example, safety edges 28 and 44 can be a solid piece of material, a foam, a honeycomb, arrays of cantilevered elements, include one or more voids or fluid filled pockets, a laminate or layers to achieve a specific desired degree of flexibility and resilience for a given application. Safety edges 28 and 44 can also preferably be painted and/or prefabricated into one or more colors.

Safety edge door 12 can also include a door edge 57 that has similar dimensions to safety edges 28 and 44 and is a non-safety edge. Door edge 57 is a replacement component of door 12 that converts door 12 to a standard door without safety edges. One or more edges 57 can be used alone or in combination with safety edges 28 and 44.

Safety edge door 12 is constructed to purposefully emulate the appearance of a standard door. In this regard it is understood that while door 12 is portrayed herein as a panel door with stiles, a top rail, bottom rail and panels, door 12 can be any kind of door to include, for example, a metal door, luan door, etc. To further the desired seamless appearance of safety edges 28 and 44, door 12 can selectively include a decorative molding 58 that functions as a façade on first side 22 and/or second side 24. Moldings 58 are constructed to conform to the ornamental appearance of door 12 and visually overlay at least a portion of safety edges 28, 42 to conceal the connection between safety edges 28, 44 and door 12. Depending upon the style of door 12, molding 58 can extend across a portion, such as one of the stiles or the entire first side 22 or second side 24. Moldings 58 can be partially or fully flexible and resilient components. In addition, moldings 58 can be paintable and/or prefabricated into one or more colors similar to that of safety edges 28 and 44.

Moldings 58 can take any form to include being configured a separate assembly that removably connects to safety edges 28, 44 or monolithically formed with safety edges 28, 44. Moldings 58 that are a separate assembly are preferably connected to door 12 using fasteners that are not visible. These can include for example, snaps, friction connections as well as threaded connectors that can be concealed. In this preferred embodiment, door 12 includes a standard door hinge 60 and a unique modified safety door hinge 62 that receives safety edge 28.

Figure 2:
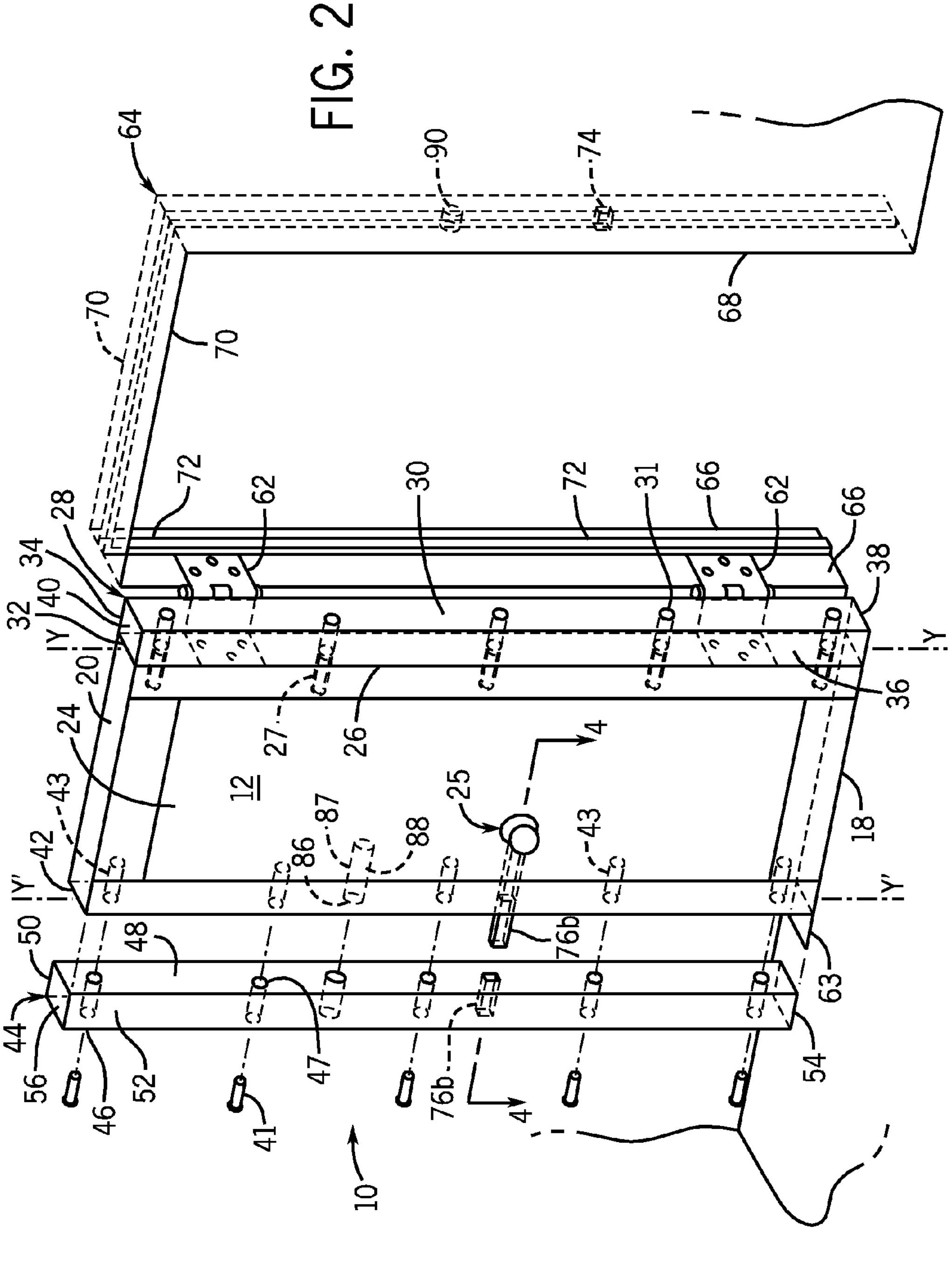
FIG. 2 is a second longitudinal edge, second side and top edge perspective view of the safety edge door of FIG. 1 that further includes the safety edge door apparatus connected to a door frame by safety hinges, an exemplary safety edge extends between a bottom edge of the door and a top edge of the door.

As shown in FIGS. 1 and 2, door 12 can also include one or both notches 26 and 42 that are single elongate recessed surfaces that extend longitudinally for the full height of door 12 between third edge 18 and fourth edge 20. As described previously, notches 26 and 42 are recessed surfaces that extend inward for a predefined distance from first edge 14 and/or second edge 16. Similarly, fasteners 27, 43 connect safety edges 28, 44 to their respective recessed surfaces or notches 26, 42. It is understood that position of each notch 26, 42 can vary in its position and length along longitudinal edges 14 and 16 of door 12.

When safety edges 28 and 44 are installed in door 12, fifth walls 38, 54 approximately align with third edge 18 and sixth walls 40, 56 approximately align with fourth edge 20. Safety edges 28 and 44 preferably connect to recessed surfaces 26 and 42 and extend laterally so as to approximately align walls 30 and 46 with door 12 edges 14 and 16, respectively. Walls 34, 50 align with first side 22 of door 12 and walls 36, 52 align with second side 24. As described previously, fasteners 47 are shown in this one example as threaded apertures that receive threaded connectors 41.

A stop 63 connects to door 12 that is preferably in proximity to third edge 18 of door 12 and extends laterally to approximately align with first wall 46 of second safety edge 44. Stop 63 preferably adds stiffness to safety edge 44 in proximity to the intersection of first edge 46 and fifth edge 54 and interfaces with a door frame 64 to provide additional support to door 12 when in a closed position with door frame 64. Stop 63 is preferably a resilient element that is stiffer than safety edge 44, but retains the ability to provide a margin of safety similar to that of safety edges 28 and 44. In this preferred embodiment, door 12 is connected to frame 64 using one or more safety hinges 62 that accommodate the safety edge 28 along the longitudinal length of recessed edges 26 and 42 of door 12.

Door frame 64 includes a first elongate member 66 and a second opposing elongate member 68 that are connected together by a cross member 70. An inner frame 72 extends along the inner side of members 66, 68 and 70 and functions to limit the travel or as a stop for door 12 in door frame 64 in combination with a latch receptacle 74. Inner frame 72 functions as a stop for the upper portion of door 12 in proximity to fourth edge 20 and stop 63 functions to provide additional stiffness in proximity to first wall 46 of second safety edge 44 and edge 18 of door 12.

Door 12 defines an aperture 75 that receives and accommodates the movement of a bolt 76 of latch mechanism 25. Bolt 76 can be a standard bolt mechanism for the application when bolt 76 does not extend through safety edge 44 as shown in FIG. 1 or alternatively can include a first distal portion **76*a* and a second proximal portion 76*b* as shown in FIG. 2. Door 12 and door frame 64 can further include other latch and/or locking mechanism such as a dead bolt lock assembly 86 that includes a dead bolt 87 that moves in an aperture 88 defined in door 12. Dead bolt 87 is received by a latch or receptacle 90 in door frame 64**.

Figure 3:
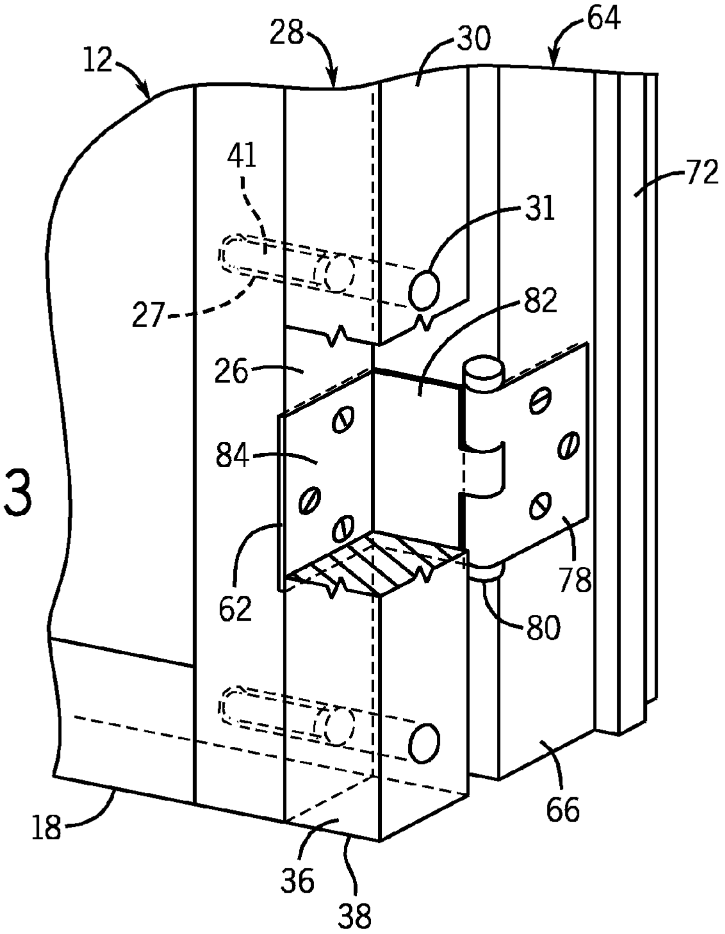
FIG. 3 is a close up perspective view of the safety hinge of the safety edge door apparatus of FIG. 2 constructed in accordance with the present disclosure.

Referring now to FIGS. 1-3, safety hinge 62 includes a first portion and a second portion. The first portion includes a first hinge plate 78 that connects to door frame 64 and is rotatingly connected to the second portion. In this preferred embodiment the rotating connection is a modified standard hinge that includes pin 80, but it is understood that safety hinge 62 can take other forms to include a flexible hinge and/or a pivot, for example. The second portion connects to the first portion and to door 12. The second portion includes a second plate or extension plate 82 and a third plate or second hinge plate 84 that preferably connects to the second recessed surface of notch 26. Extension plate 82 functions as a stand-off between the hinge and/or door frame 64 and notch 26 that is between approximately one and approximately two inches, but can be between approximately one and a half (1½) and approximately two (2) inches depending upon the intended application. Extension plate 82 defines a fixed ninety degree (90°) angle with third plate 84 hinge 62 is configured and dimensioned to receive safety edge 28. First safety edge 28 second wall 32 interfaces with third plate 84 and/or recessed surface 26 and third wall 34 interfaces with extension plate 82. First wall 30 interfaces with first hinge plate 78 and frame 64 when door 12 is in the second or closed position with frame 64. The combination of safety hinge 62 and first safety edge 28 provides a door hinge to door frame interface with an integral safety factor.

Figure 4:
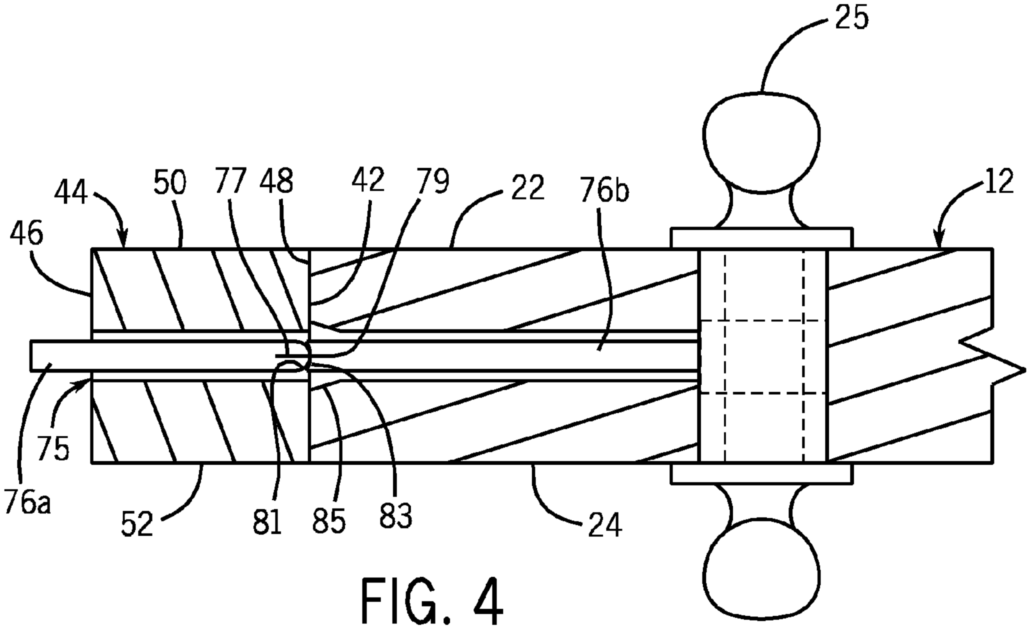
FIG. 4 is a cross-sectional view taken along lines 4-4 of FIG. 2 that shows the latch mechanism and safety edge interface.

As shown in FIGS. 1, 2 and 4, bolt 76 distal end portion **76*a* interfaces with safety edge 44 and proximal end portion 76*b* interfaces with the handle of handle assembly 25 of door 12. Handle assembly 25 performs the standard functions of door handle assemblies that include the selective latching, unlatching and/or locking with door frame 64. Door 12 aperture 75 provides for the movement of bolt portions 76*a* and 76*b* between in proximity to the door handle of door handle assembly 25 and first side 46 of second safety edge 44. Door handle assembly 25 moves bolt portions 76*a* and 76*b* between a first position and a second position. In the first position of door handle assembly 25 bolt potion 76*a* extends past first wall 46 of safety edge 44 for latching and in the second position bolt portion 76*a* is approximately recessed in second safety edge 44 of door 12**.

Bolt distal portion 76*a* and bolt proximal portion 76*b* are rigid cylindrical portions connected by a biased member 77 that forms a joint 79. The connection or joint 79 between distal bolt portion 76*a* and proximal bolt portion 76*b* urges the bolt portions 76*a* and 76*b* into a straight linear arrangement while accommodating the flexing of bolt 76 about joint 79. Distal bolt portion 76*a* flexes about biased member 77 relative to proximal bolt portion 76*b*. Biased member 77 is preferably a stiff leaf spring that urges the straight linear alignment of portions 76*a* and 76*b* while accommodating suitable deflections appropriate for distal portion 76*a* being at least partially positioned in second safety edge 44.

Referring now to FIG. 4, distal end portion 76*a* has a proximal end portion 81 that interfaces with a distal end portion 83 of proximal bolt portion 76*b*. Proximal end portion 81 and distal end portion 83 can vary in shape to facilitate the stiffness and alignment between bolt portions 76*a* and 76*b*. For example, proximal end portion 81 of distal portion 76*b* is preferably convex and distal end portion 83 of proximal end portion 76*b* is preferably correspondingly concave to receive distal end portion 83. It is understood, however, that a broad range of alternative interfaces can include straight to straight ninety degree angles as well as interfaces that limit angular displacement of joint 79.

In the first position of bolt 76, joint 79 is approximately aligned with the junction of second longitudinal side 48 of second safety edge 44 and notch or cut out 42 of second edge 16 of door 12. A distal tip of distal portion 76*a* extends from safety edge 44. The bolt 76 moves within aperture 75 and is biased to the first position as is common to door latching mechanisms. The approximate alignment of joint 79 and cut out 42 in the first position advantageously accommodates the resilient flexing of distal portion 76*a* relative to proximal portion 76*b*. The resilient flexing of distal portion 76*a* is independent of the resilient flexing of second safety edge 44, but it is understood that bolt 76 and safety edge 44 are preferably constructed such that the displacement of second safety edge 44 in proximity to distal portion 76*a* also resiliently flexes distal portion 76*a*. Similarly, the displacement of the tip of distal portion 76*a* can result in the resilient flexing of the second safety edge 44 and distal portion 76*a*.

As shown in FIG. 5, in the second position of bolt 76 when the distal tip of distal portion 76*a* is approximately aligned with first longitudinal side 46 of second safety edge 44 and joint 79 is recessed within and proximal to notch 42 in door 12. To facilitate the movement of distal portion 76*a* relative to proximal portion 76*b*, aperture 75 in door 12 can include a countersink 85 that facilitates the flexing of distal portion 76*a* about recessed joint 79. Countersink 85 is preferably conical in shape and provides for a three-dimensional movement of distal portion 76*a* relative to proximal portion 76*b* and/or in coordination with safety edge 44.

The bolt portions 76*a* and 76*b* as described above are preferably made of rigid materials, but bolt portion 76*a* and 76*b* can also have alternative material constructions, such as a semi-rigid polymer or laminate rod or tube that can resiliently flex about any point while providing the desired stiffness for latching and locking for a given application. It is understood that many interior doors in homes and many commercial nursery or schooling establishments do not require locking mechanisms because of the desire for unlimited accessibility. Similarly, external doors and rooms that warrant privacy require secure locking mechanisms. The security of the safety edge door 12 latching mechanism 25 can be enhanced by the addition of one or more dead bolt lock assemblies 86 (see FIG. 2).

In operation as shown in FIGS. 1 and 2, door 12 can be configured with safety edge 28, safety edge 44 and/or door edge 57 to provide the desired level of safety protection for objects that include fingers, toes, other portions of the human body, body portions of other animals and property from becoming damaged in a traditional hinged door. Safety edges 28 and/or 44 can be connected to or removed from door 12 using common standard tools prior to installation of door 12 or after installation. Door 12 can be converted between safety door 12 and a standard door using replacement edges 57. Door 12 can also include door frame 64. Stop 63 can be similarly installed and removed from door 12. In addition, decorative molding 58 can be selectively employed to conceal the connections between door 12, first safety edge and second safety edge to provide the appearance of door 12 as a standard door. Further, a resiliently flexible bolt 76 of latch mechanism 25 as described herein can be employed or replaced by a standard latch mechanism.

As shown in FIGS. 1-5, first safety edge 28 connects to recessed surface 26 and is positioned to resiliently flex when displaced by an object. For example, when door 12 is in an open position and the object is positioned between safety edge 28 and first vertical frame member 66 of frame 64 and door 12 is moved to a closed position in door frame 64, safety edge 28 resiliently flexes to accommodate the object between first longitudinal wall 30 and hinge 62 and/or first vertical member 66 of door frame 64. Safety edge 28 is constructed to primarily resiliently flex about the connection between safety edge 28 and recessed surface 26 and preferably about recessed surface 26 that is aligned with longitudinal axis Y. Safety edge 28, however, is resiliently flexible in all directions and can resiliently flex about any one or more combinations of axes. Safety edge 28 can also resiliently flex in compression between first longitudinal wall 30 and second longitudinal wall 32, third longitudinal wall 34 and fourth longitudinal wall 36 and combinations thereof. As described previously molding 58 can be a layer at least across the joint between first safety edge 28 and recessed surface 26 that resiliently flexes with or independent of safety edge 28 when displaced by the object.

Referring now to FIGS. 2-4 and 7, when a portion of a hand 3 is inserted between door frame 64 and first longitudinal side 30 of first safety edge 28 as door 12 is being closed, first flexible edge 28 positioned in safety hinge 62 resiliently flexes to accommodate hand 3. Safety hinge 62 provides a safe spacing for safety edge 28 that resiliently flexes to accommodate the positioning of a body part or a portion of hand 3. In this exemplary instance, first side 30 and third side 34 are resiliently displaced by hand portion 3 positioned against first vertical frame member 66, for this one example, as door 12 is closed. It is understood that the portion of hand 3 could be placed directly against first hinge plate 78 of safety hinge 62 connecting to first vertical frame member 66 and safety edge 28 and safety hinge 62 still provides the required flexibility and spacing to preclude the accidental injuring of hand portion 3.

As shown in FIGS. 2 and 6, second safety edge 44 second longitudinal side 48 is connected to recessed surface 42 and is positioned to resiliently flex when displaced in a similar manner as that described previously for first safety edge 28. When hand portion 3 is inserted between first longitudinal side 42 of second safety edge 44 and second vertical frame member 68 of door frame 64 as door 12 is being closed, second flexible edge 44 resiliently flexes to accommodate a portion of a body part such as a portion of a hand 3. Similarly, distal bolt portion 76*a* of latch mechanism 25 resiliently flexes to provide additional spatial accommodation for the portion of hand 3. Safety edge 44 provides for the safe positioning of objects and body parts such as fingers as one hand portion 3 between safety edges 28 and 44 of door 12 and door frame 64.

In the preceding specification, the present disclosure has been described with reference to specific exemplary embodiments thereof. It will be evident, however, that various modifications, combinations and changes may be made thereto without departing from the broader spirit and scope of the invention as set forth in the claims that follow. For example, while a single safety edge door apparatus 10 can include a removable and replaceable non-safety edge 57 that extends between the bottom and top edges of the door that can further be broken into partial elements for the lower and upper portions of the door as described in different configurations of notches 26, 42 and safety edges 28, 44. In addition, though the present invention is described in terms of a series of embodiments, each embodiment of the present invention can combine one or more novel features of the other embodiments. The specification and drawings are accordingly to be regarded in an illustrative manner rather than a restrictive sense.

What is claimed is:

1. A safety door apparatus that comprises:

a door that includes a first elongate edge, a second elongate edge opposed to the first edge, a bottom edge, a top edge opposed to the bottom edge, the side edges connected to the bottom edge and top edge, a first side and an opposed second side that connect to the edges;

a notch defined in at least one of the elongate edges of the door, the notch extends inward from the elongate edge along the bottom edge for a predetermined distance to define a first recessed surface, the notch defines a second recessed surface that extends from the bottom edge of the door to a position at least between the bottom edge and in proximity to and below a door handle assembly of the door, the door handle assembly includes a bolt that extends through the safety edge;

a safety edge that mates with the notch and removably connects to the door, the safety edge has a first wall, a second wall opposed to the first wall, a third wall and a fourth wall opposed to the third wall, a fifth wall and a sixth wall opposed to the fifth wall, the safety edge approximately aligns with the elongate edge that defines the notch, the bottom edge and the sides of the door, the safety edge fabricated of a resilient material; and a hinge assembly that connects to the door, the hinge assembly includes a first portion and a second portion connected by a hinge, the first portion includes a first plate and the second portion includes a second plate and a third plate, the first plate is adapted to connect to a door frame, the second plate is approximately aligned with the first side of the door and connects at an approximately perpendicular angle to the third plate, the third plate connects to the notch, the second portion of the hinge assembly receives the safety edge, the first portion rotatable about the hinge assembly relative to the second portion.

2. The safety door of claim 1, wherein the notch extends along the elongate edge from the bottom edge to an area below and in proximity to the door handle assembly.

3. The safety door of claim 1, wherein the notch and mating safety edge extend along the elongate edge from the bottom edge to a position between the bottom edge and below and in proximity to the door handle assembly and in proximity to the top edge of the door.

4. The safety door of claim 3, wherein the door includes a stop approximately aligned with the bottom edge of the door.

5. The safety door of claim 1 that further includes a second safety edge and the safety edges are positioned in notches on the first elongate edge and the second elongate edge of the door.

6. The safety door of claim 5, wherein the safety edges are interchangeable.

7. The safety door of claim 1, wherein the door includes a decorative molding that at least partially conceals the safety edge to door interface.

8. The safety door of claim 1, wherein the bolt is a flexible assembly that can flex with the displacement of the safety edge.

9. The safety door of claim 1, wherein the bolt includes a distal portion and a proximal portion connected by a joint, the joint biased to resiliently accommodate the displacement of the distal portion of the bolt relative to the proximal portion.

10. The safety door of claim 1, wherein a first recessed surface of the notch extends inward from the first elongate edge of the door for between approximately one inch and approximately two inches and a second recessed surface of the notch extends upwards from the bottom edge, the second recessed surface approximately aligned with the first edge of the door, the second recessed surface defines a longitudinal axis.

11. The safety door of claim 1, wherein the door includes a removable and replaceable non-safety edge.

12. A safety door apparatus that comprises:

a door that includes a first elongate edge, a second elongate edge opposed to the first edge, a bottom edge, a top edge opposed to the bottom edge, the side edges connected to the bottom edge and top edge, a first side and an opposed second side that connect to the edges;

a notch defined in at least one of the elongate edges of the door, the notch extends inward from the first elongate edge along the bottom edge to define a first recessed surface, the notch extending from the bottom edge of the door upward to define a second recessed surface, the distance between the first elongate edge and the second recessed surface adapted to provide for the safe positioning of a finger portion of a hand;

a safety edge that conformingly mates with the notch and removably connects to the door, the safety edge has a first wall, a second wall opposed to the first wall, a third wall and a fourth wall opposed to the third wall, a fifth wall and a sixth wall opposed to the fifth wall, the safety edge approximately aligns with the elongate edge that defines the notch, the bottom edge and the sides of the door, the safety edge fabricated of a resilient material;

a door handle assembly, the door handle assembly includes a bolt that extends through the safety edge;

a hinge assembly that connects to the door, the hinge assembly includes a first portion and a second portion connected by the hinge, the first portion includes a first plate and the second portion includes a second plate and a third plate, the first plate is adapted to connect to a door frame, the second plate is approximately aligned with the first side of the door and connects at an approximately perpendicular angle to the third plate, the third plate connects to the second recessed edge of the notch, the first portion rotatable about the hinge assembly relative to the second portion, the safety edge positionable in the perpendicular angle of the second portion; and a decorative molding positionable over the connection between the safety edge and the door.

13. The safety door of claim 12, wherein the safety edge extends from the bottom edge to an area below and in proximity to the door handle assembly.

14. The safety door of claim 12, wherein the safety edge extends upward from the bottom edge to a position between above and in proximity to the door handle assembly and the top edge of the door.

15. The safety door of claim 14, wherein the bolt of the door handle assembly is a flexible bolt.

16. The safety door of claim 14, wherein the door includes a stop aligned with the bottom edge of the door.

17. The safety door of claim 12 that further includes a door frame that connects to the door.

18. A safety door apparatus that comprises:

a door that includes a first elongate edge, a second elongate edge opposed to the first edge, a bottom edge, a top edge opposed to the bottom edge, the side edges connected to the bottom edge and top edge, a first side and an opposed second side that connect to the edges;

a notch defined in at least one of the elongate edges of the door, the notch extends inward from the first elongate edge along the bottom edge to define a first recessed surface, the notch extending from the bottom edge of the door upward to define a second recessed surface, the distance between the first elongate edge and the second recessed surface adapted to provide for the safe positioning of a finger portion of a hand;

a safety edge that conformingly mates with the notch, the safety edge removably connects to the door, the safety edge has a first wall, a second wall opposed to the first wall, a third wall and a fourth wall opposed to the third wall, a fifth wall and a sixth wall opposed to the fifth wall, the safety edge approximately aligns with the elongate edge that defines the notch, the bottom edge and the sides of the door, the safety edge fabricated of a resilient material;

a door handle assembly, the door handle assembly includes a bolt that can extend through the safety edge;

a hinge assembly that connects to the door, the hinge assembly includes a first portion and a second portion connected by the hinge, the first portion includes a first plate and the second portion includes a second plate and a third plate, the first plate is adapted to connect to a door frame, the second plate is approximately aligned with the first side of the door and connects at an approximately perpendicular angle to the third plate, the third plate connects to the recessed edge of the notch, the first portion rotatable about the hinge assembly relative to the second portion, the safety edge positionable in the perpendicular angle of the second portion; and a decorative molding positionable over the connection between the safety edge and the door.

19. The safety door of claim 18 wherein the notch and safety edge extend upward from the bottom edge to a position at least above the door handle assembly and the bolt of the door handle assembly is a flexible bolt that extends through the safety edge.

* * * * *